(12) United States Patent
Rothman et al.

(10) Patent No.: US 7,870,373 B2
(45) Date of Patent: Jan. 11, 2011

(54) SYSTEM AND METHOD FOR AUTOMATIC UPDATE OF EMBEDDED DATA (75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 781 days.

(21) Appl. No.: 11/317,752

(22) Filed: Dec. 23, 2005

(65) Prior Publication Data

US 2007/0150715 A1 Jun. 28, 2007

(51) Int. Cl.
*G06F 15/177* (2006.01)
(52) U.S. Cl. .......................................... 713/1; 713/100
(58) Field of Classification Search .................... 713/1, 713/2, 100
See application file for complete search history.

(56) References Cited

U.S. PATENT DOCUMENTS 5,165,091 A * 11/1992 Lape et al. .................. 370/216
6,640,334 B1 * 10/2003 Rasmussen .................. 717/171
7,409,575 B2 * 8/2008 Komarla et al. .............. 714/2
7,552,217 B2 * 6/2009 Mihm et al. ................. 709/227
2002/0012347 A1 * 1/2002 Fitzpatrick .................. 370/392
2005/0027831 A1 * 2/2005 Anderson et al. ........... 709/220
2005/0229173 A1 * 10/2005 Mihm et al. ................. 717/171

\* cited by examiner

*Primary Examiner*—Thomas Lee
*Assistant Examiner*—Eric Chang
(74) *Attorney, Agent, or Firm*—Crystal D. Sayles (57) ABSTRACT

A system and method for maintaining computer platform components in an optimal state. The method determines whether a platform includes an out-of-band processor, and if the platform includes an out-of-band processor, then the out-of-band processor is enabled to passively or proactively obtain firmware and/or option ROM (Read Only Memory) updates for add-in cards on the platform. Once the out-of-band processor has obtained the updates for the add-in cards on the platform, the out-of-band processor will place the updates in a platform mailbox and send an interrupt to the in-band processor indicating that firmware and/or option ROM updates are available in a platform mailbox. The in-band processor will launch the firmware and/or option ROM updates on the platform.

30 Claims, 5 Drawing Sheets

SYSTEM AND METHOD FOR AUTOMATIC UPDATE OF EMBEDDED DATA

BACKGROUND OF THE INVENTION

1. Field of the Invention

The present invention is generally related to the field of computer platforms. More particularly, the present invention is related to a system and method for automatically maintaining components of a computing platform operating in an optimal state.

2. Description

Today's computing platforms have a large variety of components/devices, thus making them much more complex and difficult for the average user to support. Each of the components/devices on a computing platform may need to be periodically updated. For example, a motherboard may have a platform management agent that may proxy firmware updates to the components/devices typically found on the motherboard. Thus, updates to these typical components/devices may be facilitated by the platform management agent in conjunction with a remote administrator.

For devices that are added to the motherboard, i.e., non-standard devices or add-in cards, the platform management agent may not be able to communicate with these add-in cards, and therefore may be unable to facilitate any kind of component/device firmware updates. Remote administrators may not even be aware of the add-in cards, and thus, are also unable to facilitate any kind of component/device firmware updates.

Since platforms do not provide a generic means in which firmware updates for these add-in devices may be maintained, tracking firmware updates for these individual add-in devices is left to the user. To perform an update for these add-in devices, a typical user would have to determine or know what add-in devices are found on the system, the location of each add-in device, and the current firmware version that is running on each add-in device. Then the user would have to connect to independent hardware vendor websites for the add-in devices to obtain the latest code/option ROM (Read-Only Memory) firmware data, download the correct version of firmware data, and run installation software to update the firmware for each of the add-in devices. Often times, the user may then have to reboot his/her computer system to initiate the firmware updates. Thus, keeping track of, and performing, firmware updates for add-in devices is a tedious and time consuming job that the typical user does not have the time or the where with all to do.

Therefore, what is needed is a means by which firmware components, such as, for example, device option ROMs and device drivers, may be managed autonomously by the residing platform to provide these devices with the latest firmware or option ROM updates.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to a system and method for enabling a computer platform to autonomously maintain individual add-in components/devices of the platform in an optimal state. Embodiments of the present invention enable communication with the outside world regardless of the current platform's in-band I/O (Input/Output) state. This is accomplished by utilizing platforms having in-band and out-of-band processors to autonomously maintain the state of the component/device firmware or option ROMs without the need for a user to (1) determine what add-in components/devices they have on their system, (2) search for corresponding repositories of the latest firmware or option ROM data for the add-in components/devices, and (3) download the correct version to update the platform components/devices. This can be done in a seamless fashion by the platform firmware for the add-in components/devices in question.

Although embodiments of the present invention are directed to providing firmware or option ROM updates to add-in cards, the invention is not limited to add-in cards. One skilled in the relevant art(s) would know that embodiments of the invention may also be applicable to any other components/devices that may be attached to or added to the motherboard that are not maintained in an optimal state by the platform, yet have firmware or option ROMs that need to be updated from time to time.

Figure 1:
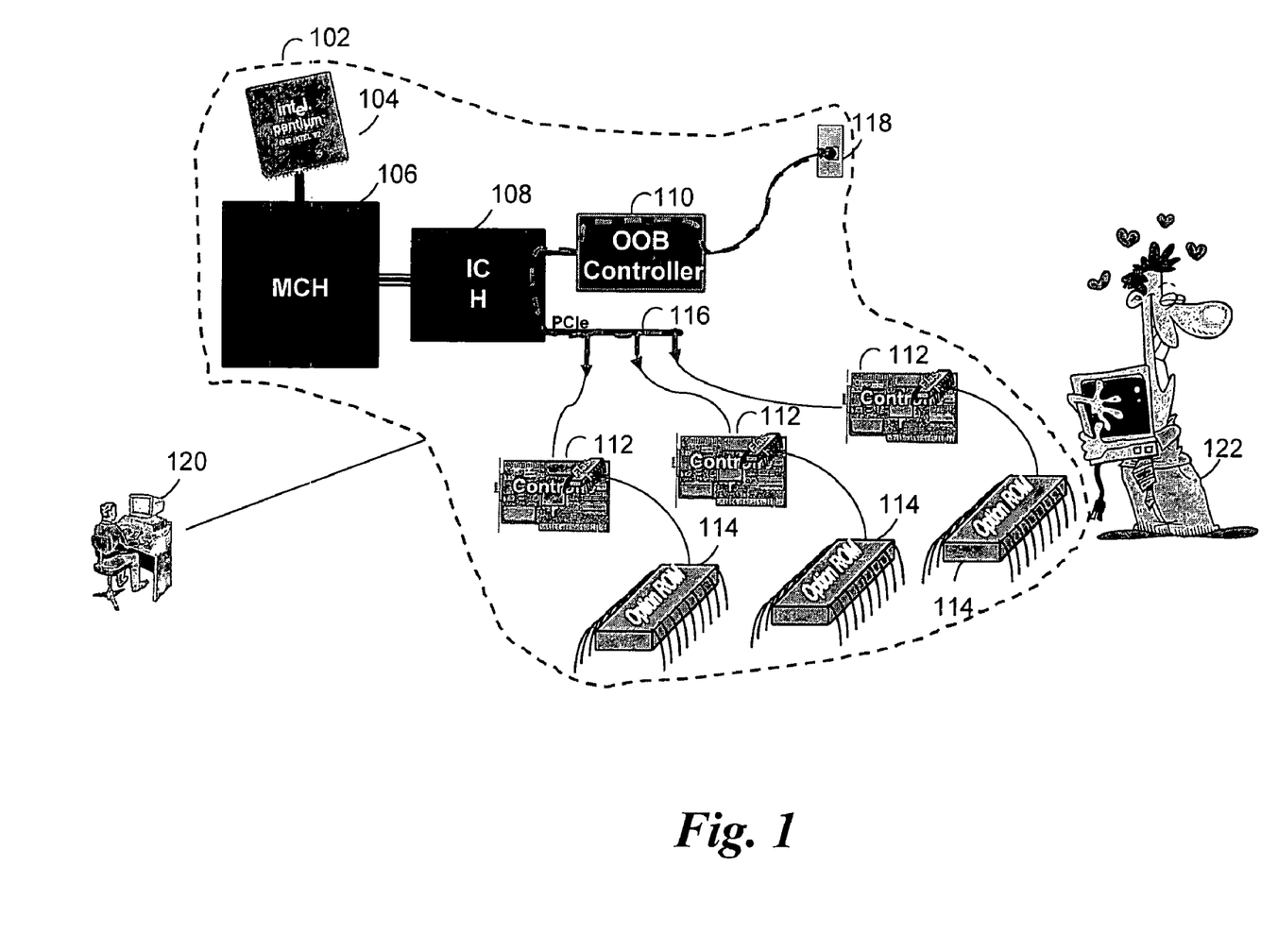
FIG. 1 is a high level block diagram illustrating an exemplary system for enabling a platform to autonomously provide firmware updates for add-in cards according to an embodiment of the present invention.

FIG. 1 is a high level block diagram illustrating an exemplary system 100 for enabling a platform to autonomously provide firmware updates for add-in cards according to an embodiment of the present invention. System 100 comprises a platform 102 having an in-band processor 104, a Memory Controller Hub (MCH) 106, an I/O (Input/Output) Controller Hub (ICH) 108, an out-of-band microcontroller 110, a plurality of add-in cards 112 (indicated as controllers), each controller 112 having an option ROM 114. In-band processor 104 is coupled to MCH 106. MCH 106 is coupled to ICH 108. ICH 108 is coupled to out-of-band microcontroller 110. ICH 108 is also coupled to controllers 112 via a PCI bus 116.

Out-of-band microcontroller 110 communicates with servers and/or an administrator via a network connection 118. Out-of-band microcontroller 110 also communicates with controllers 112 via ICH 108 and PCI bus 116 to autonomously maintain the state of firmware or option ROMs 114 for each controller 112. Out-of-band microcontroller 110 accomplishes this without the need for a user to determine what add-in cards are included on platform 102. The user no longer has to search for a corresponding repository of the latest firmware or option ROM data and download the correct version to update controllers 112. With embodiments of the present invention, out-of-band microcontroller 110 may communicate directly with servers on the network or with a remote administrator (not shown) via network connection 118 to proxy firmware or option ROM updates to add-in cards 112. In fact, this communication may take place unbeknownst to the user. Thus, when the user boots his/her system 120, the firmware/option ROM updates are automatically installed via installation software and, if necessary, the user may only have to reboot his/her system to initiate the firmware updates. Thus, the user is a happy camper (as shown at reference 122) because the user no longer has to be concerned with providing firmware or option ROM updates for the add-in cards (controllers 112) on his/her computer platform 102.

Embodiments of the present invention use computer platforms that contain at least one in-band processor and at least one out-of-band microcontroller. Embodiments of the present invention leverage the capabilities of the out-of-band microcontroller to enable platform 102 to autonomously maintain any add-in components/devices in an efficient and seamless manner. Since the out-of-band microcontroller has no dependencies on the operating system, an in-band processor may be in operation or running on standby while the out-of-band microcontroller operates intelligently based on incoming queries/commands and communicates across the network to other entities, such as, but not limited to, remote administrators of platform 102 or servers on a network, such as, for example, the Internet.

Figure 2:
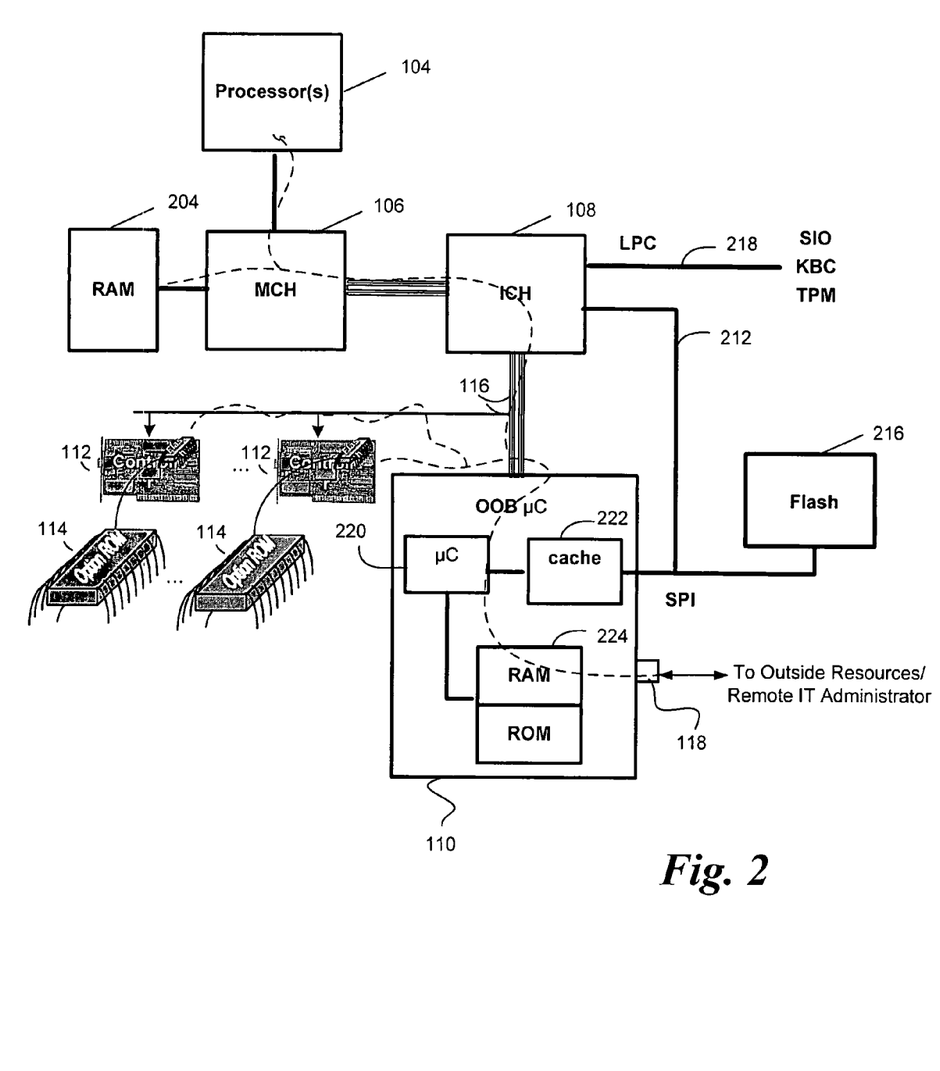
FIG. 2 is a block diagram illustrating a detailed exemplary platform having an out-of-band microcontroller for implementing an embodiment of the present invention.

FIG. 2 is a block diagram illustrating a detailed exemplary platform 102 having an out-of-band microcontroller for implementing an embodiment of the present invention. Platform 102 comprises processor 104, which may be referred to as an in-band processor. Processor 104 may connect to a system memory 204 via memory controller hub (MCH) 106. Processor 104 may be any type of processor capable of executing software, such as, for example, a microprocessor, digital signal processor, microcontroller, or the like. Although FIG. 2 shows a single processor 104, in embodiments, there may be one or more in-band processors included in platform 102. The one or more in-band processors may include multiple threads, multiple cores, or the like.

Processor 104 may be connected to I/O (Input/Output) devices via input/output controller hub (ICH) 108. ICH 108 may be coupled to various I/O devices, such as, for example, a super I/O controller (SIO), a keyboard controller (KBC), or a trusted platform module (TPM) via a low pin count (LPC) bus 218. The SIO may have access to floppy drives or industry standard architecture (ISA) devices. In an embodiment, ICH 108 may be coupled to a non-volatile memory 216 via a serial peripheral interface (SPI) bus 212. Although shown in FIG. 2 as a flash memory, non-volatile memory 216 may be, but is not limited to, flash memory, static random access memory (SRAM), or the like.

An out-of-band (OOB) microcontroller 110 may be coupled to ICH 108 via peripheral component interconnect (PCI) or PCI express bus 116. OOB microcontroller 110 may also be coupled to non-volatile memory 216 via SPI bus 212. OOB microcontroller 110 comprises processor 210 which may be operatively coupled to a cache memory 222 as well as RAM and ROM memory 224. OOB microcontroller 110 may have an independent connection to a power supply (not shown) to enable out-of-band communications even when in-band processor 104 is not active. OOB microcontroller 110 may have a built-in network interface 118 to enable out-of-band communications with other devices, such as, but not limited to, servers on a network such as, for example, the Internet, a remote IT (Information Technology) administrator on a network, such as, for example, the Intranet, etc. OOB microcontroller 110 may also be coupled to add-in cards (i.e., controllers 112) via PCI bus 116. Each of controllers 112 may have associated firmware or option ROMs 114 that are updated periodically using an autonomous method described below with respect to FIGS. 3-5.

Figure 3:
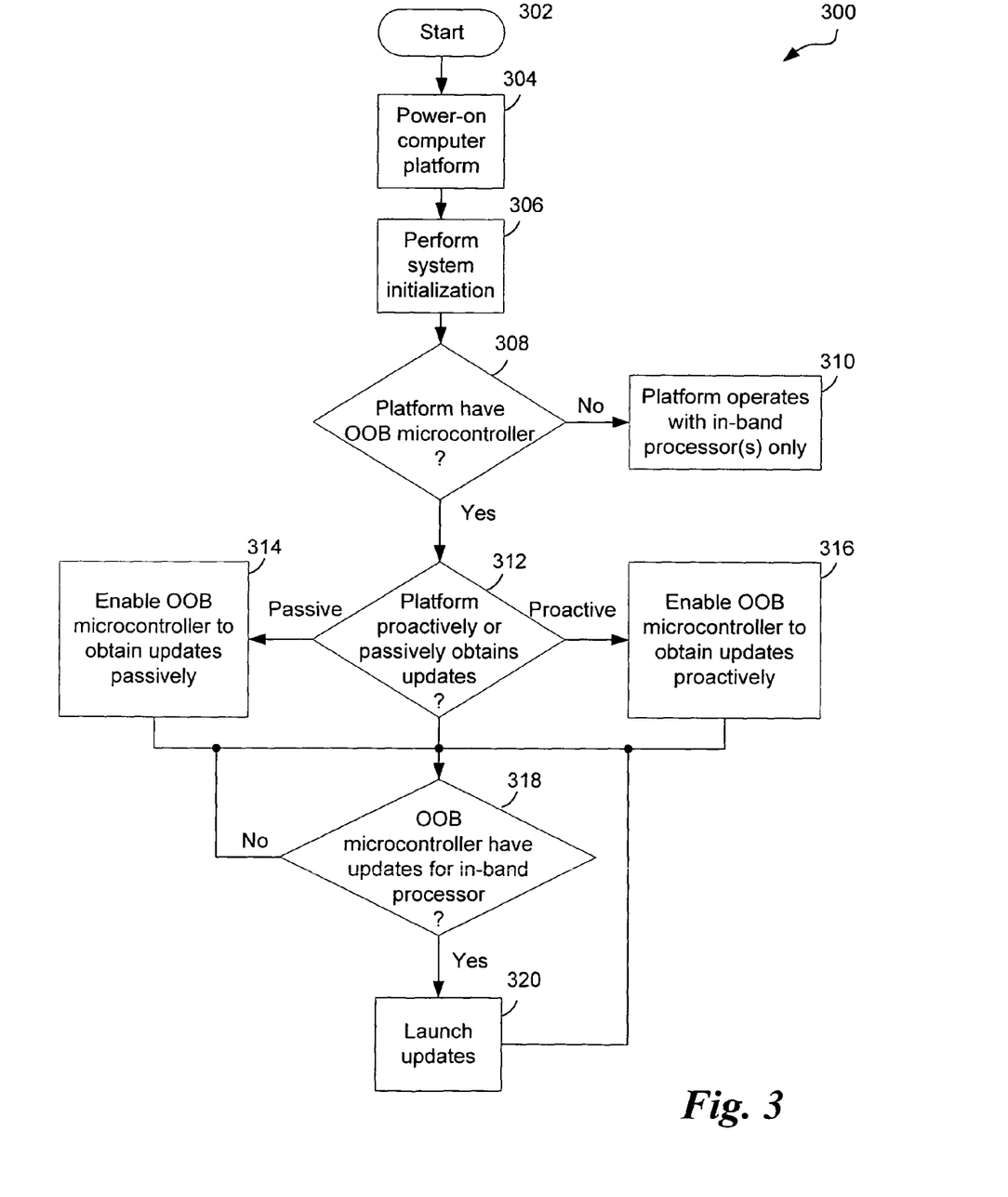
FIG. 3 is a flow diagram describing an exemplary method for enabling a platform to autonomously provide firmware updates for add-in cards according to an embodiment of the present invention.

FIG. 3 is a flow diagram describing an exemplary method for enabling a platform to autonomously provide firmware updates for add-in cards according to an embodiment of the present invention. The invention is not limited to the embodiment described herein with respect to flow diagram 300. Rather, it will be apparent to persons skilled in the relevant art(s) after reading the teachings provided herein that other functional flow diagrams are within the scope of the invention. The process begins with block 302, where the process immediately proceeds to block 304.

In block 304, a computer platform is powered-on or reset. Upon powering-on or resetting the computer platform, system initialization occurs (block 306). System initialization may include, but is not limited to, executing a BIOS (Basic Input/Output System) that turns on and initializes the power supply, performs power-on self tests, executes other BIOSes, such as, for example, a video card BIOS and device firmware and option ROM BIOSes, boots an operating system, etc. After system initialization, the process proceeds to decision block 308.

In decision block 308, it is determined whether the platform has an out-of-band microcontroller. If the platform does not include an out-of-band microcontroller, then the process proceeds to block 310, where the computer platform operates in a normal fashion with in-band processors only. The platform, in this case, does not have the ability to autonomously perform firmware or option ROM updates for the add-in cards.

Returning to decision block 308, if it is determined that the platform has an out-of-band microcontroller; the process proceeds to decision block 312. In decision block 312, it is determined whether the platform passively or proactively obtains firmware or option ROM updates for the add-in cards on the platform. If it is determined that the platform passively obtains firmware or option ROM updates for the add-in cards on the platform, the process proceeds to block 314.

In block 314, the out-of-band microcontroller obtains firmware/option ROM updates from a remote IT (Information Technology) administrator. This process is described in detail below with reference to FIG. 4. The process then proceeds to decision block 318.

Returning to decision block 312, if it is determined that the platform proactively obtains firmware or option ROM updates for the add-in cards on the platform, then the process proceeds to block 316. In block 316, the out-of-band microcontroller obtains firmware or option ROM updates directly by querying outside resources, such as, but not limited to, vendor repositories for the latest firmware or option ROM updates. This process is described in detail below with reference to FIG. 5. The process then proceeds to decision block 318.

In decision block 318, it is determined whether the out-of-band microcontroller has firmware or option ROM updates for the in-band processor. If the out-of-band microcontroller has firmware or option ROM updates for the in-band processor, the out-of-band microcontroller will provide an interrupt for the in-band processor to indicate that firmware or option ROM updates are waiting in a platform mailbox to be launched by the in-band processor. Thus, if the out-of-band microcontroller has placed firmware or option ROM updates in the platform mailbox and provided an interrupt to the in-band processor, the process then proceeds to block 320.

Returning to decision block 318, if it is determined that the out-of-band microcontroller does not have any firmware or option ROM updates for the in-band processor, the process remains at decision block 318 to wait for any firmware or option ROM updates that may be obtained by the out-of-band microcontroller in the future.

In block 320, the in-band processor launches all firmware or option ROM updates. Each firmware or option ROM update includes information regarding the device ID and location of the device so that the in-band processor may launch the firmware or option ROM on the correct device. The process then proceeds back to decision block 318 to wait for additional firmware or option ROM updates either passively or proactively obtained by the out-of-band microcontroller.

As indicated above, the out-of-band microcontroller can passively obtain firmware or option ROM updates for add-in cards as well. With this method, the out-of-band microcontroller communicates with an IT (Information Technology) administrator to obtain the firmware or option ROM updates. In one embodiment, an IT department may provide a list of add-in cards that are allowed to be installed on the managed platforms in a network. The IT department may keep a firmware/option ROM database of all of the latest firmware and option ROM updates for all of the add-in cards on the list. Thus, the IT department/administrator is responsible for maintaining an updated database, and in one embodiment, the IT department may test the firmware and option ROMs for operability prior to placing them in the database. In this instance, only the firmware and option ROMs that pass the operability test are placed in the database. In less controlled environments, the firmware and option ROMs may be placed in the database without being tested for operability.

Figure 4:
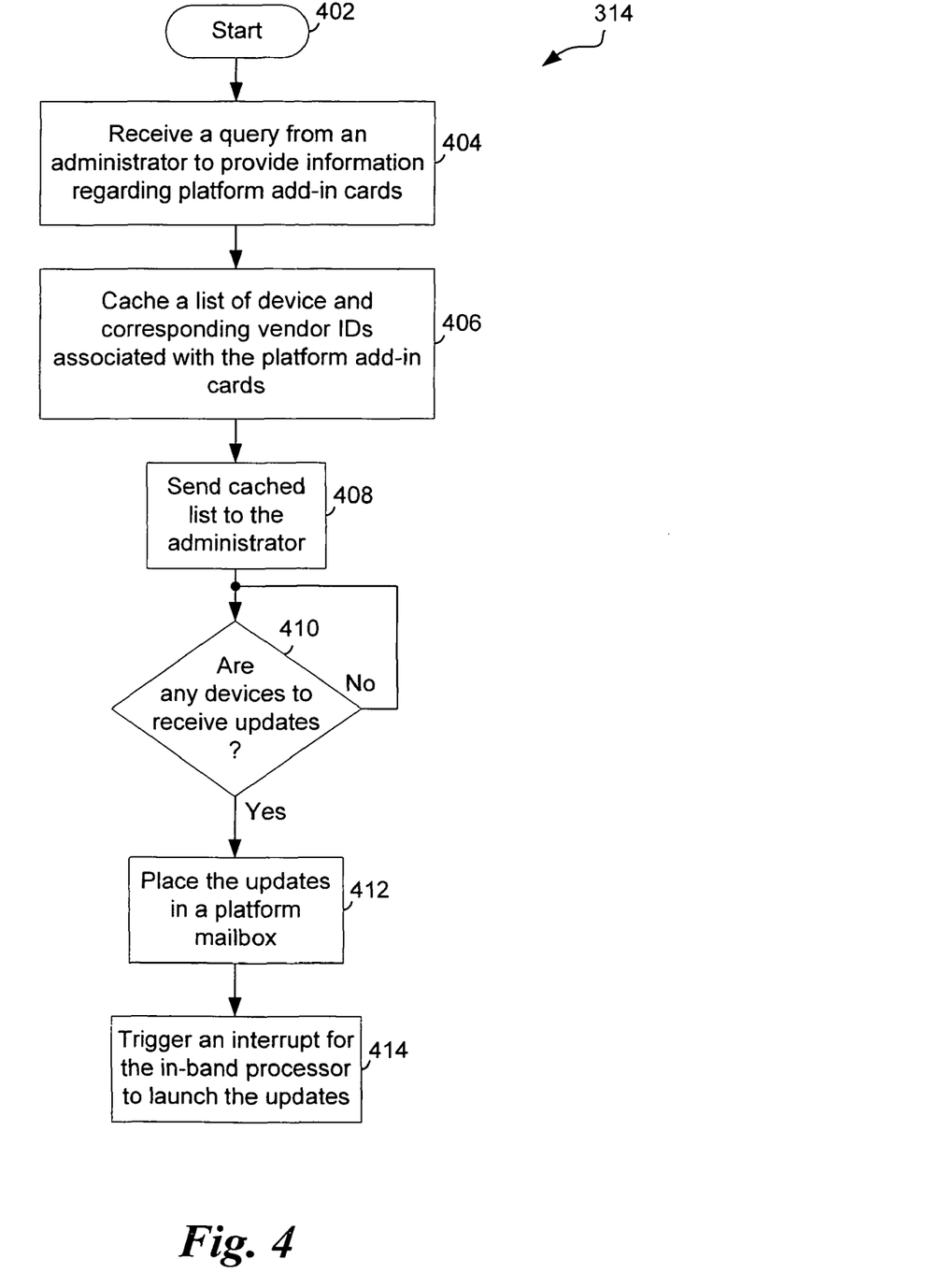
FIG. 4 is a flow diagram describing an exemplary method for enabling an out-of-band microcontroller to passively obtain firmware or option ROM updates for add-in cards according to an embodiment of the present invention.

FIG. 4 is a flow diagram 314 describing an exemplary method for enabling an out-of-band microcontroller to passively obtain firmware or option ROM updates for add-in cards according to an embodiment of the present invention. The invention is not limited to the embodiment described herein with respect to flow diagram 314. Rather, it will be apparent to persons skilled in the relevant art(s) after reading the teachings provided herein that other functional flow diagrams are within the scope of the invention. The process begins with block 402, where the process immediately proceeds to block 404.

In block 404, a remote administrator queries the out-of-band microcontroller to determine what add-in cards reside on the platform. The out-of-band processor will, in turn, interrogate the PCI configuration space of each component/device on the PCI bus to generate a cached list of the components/devices (i.e., add-in cards) in block 406. Although embodiments of the present invention are described using a PCI bus for interfacing the add-in cards to the platform, one skilled in the relevant art(s) would know that other buses that provide an infrastructure for identifying attributes of the components/devices on the bus may also be used.

In block 408, the cached list of components/devices is sent to the administrator. The administrator can then correlate the list with its own database of components/devices and determine whether firmware or option ROM updates exist for any of the component/devices in the cached list. This may be accomplished by comparing the revision number or date for the firmware or option ROMs against the revision number or date of the firmware or option ROMs in the database. If any of the revision numbers or dates of the firmware or option ROM from the database are higher or later in time, respectively, than those from the firmware or option ROMs on the components/devices, then the corresponding firmware or option ROMs from the database are sent to the out-of-band microcontroller for updating. In one embodiment, the checksum of the firmware or option ROMs from the components/devices are compared with the checksum of the firmware or option ROMs in the database. If a checksum is different, then the corresponding firmware or option ROMs from the database are sent to out-of-band microcontroller for updating the firmware or option ROMs for the add-in components/devices. The process then proceeds to decision block 410.

In decision block 410, it is determined whether any of the components/devices on the platform are to receive an update. If any of the components/devices on the platform are to receive an update, the update(s) is received by the out-of-band microcontroller. Thus, if any updates are received by the out-of-band microcontroller, the process proceeds to block 412.

In block 412, the out-of-band microcontroller, upon receipt of the update(s), places the firmware or option ROM images for the one or more devices on the cached list in a platform mailbox. The platform mailbox is accessible to both the out-of-band microcontroller and the in-band processor. The process then proceeds to block 414.

In block 414, the out-of-band microcontroller triggers an interrupt for the in-band processor to notify the in-band processor that updated firmware or option ROM images are available for launching by the in-band processor.

Returning to decision block 408, if it is determined that no components/devices on the platform are to receive updates, the process remains at block 408 to determine whether an update has been received from the remote administrator.

As previously indicated, the out-of-band microcontroller may also proactively obtain firmware or option ROM updates for add-in cards on the computer platform. In this instance, the out-of-band microcontroller communicates with outside resources, such as, for example, servers on the Internet that contain repositories of vendor firmware or option ROM updates for the add-in cards.

Figure 5:
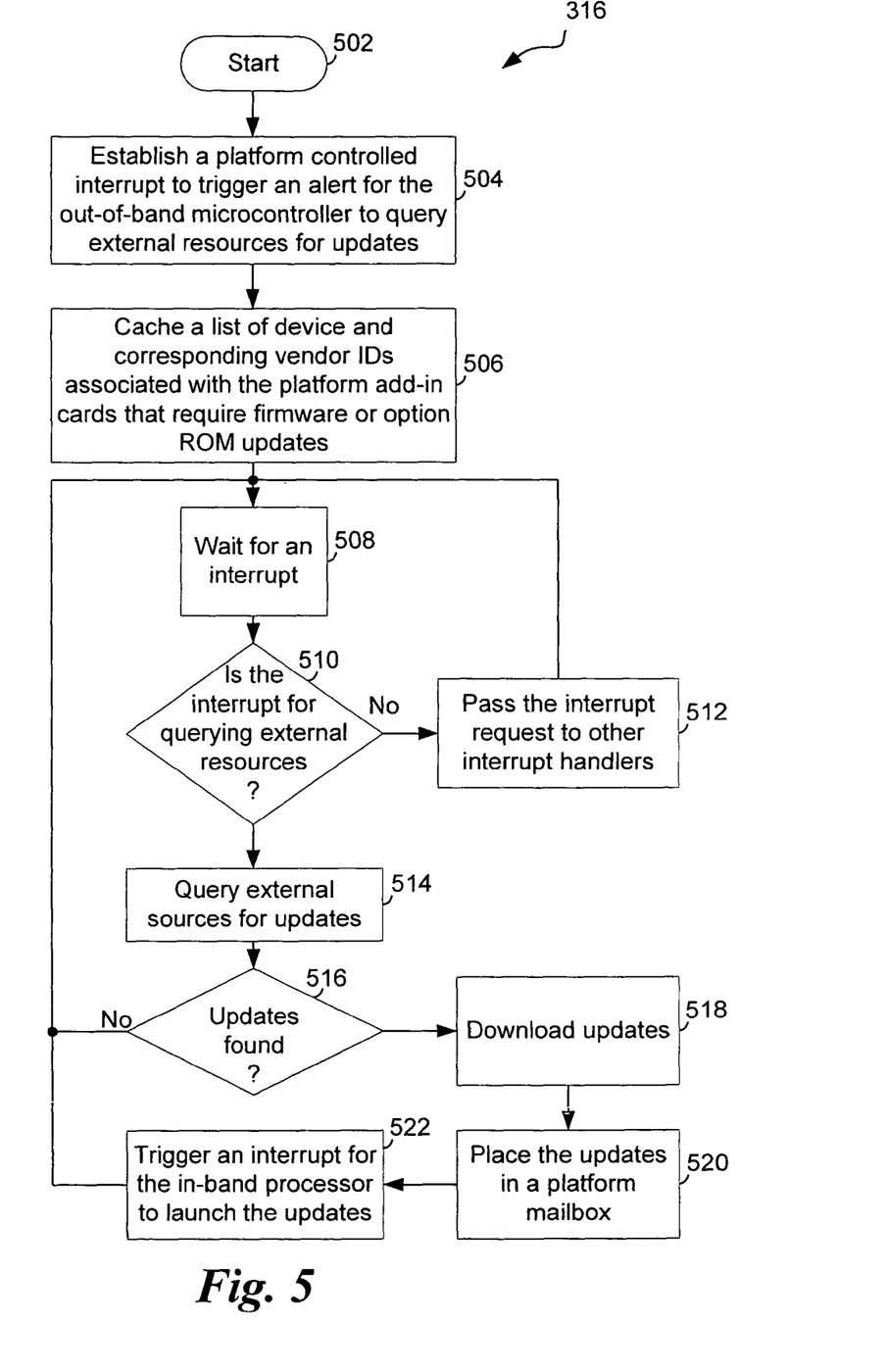
FIG. 5 is a flow diagram describing an exemplary method for enabling an out-of-band microcontroller to proactively obtain firmware or option ROM updates for add-in cards according to an embodiment of the present invention.

FIG. 5 is a flow diagram 316 describing an exemplary method for enabling an out-of-band microcontroller to proactively obtain firmware or option ROM updates for add-in cards according to an embodiment of the present invention. The invention is not limited to the embodiment described herein with respect to flow diagram 316. Rather, it will be apparent to persons skilled in the relevant art(s) after reading the teachings provided herein that other functional flow diagrams are within the scope of the invention. The process begins with block 502, where the process immediately proceeds to block 504.

In block 504, a platform controlled interrupt to trigger an alert/event for the out-of-band microcontroller to query external resources for firmware or option ROM updates is established. The interrupt is established by the in-band processor. The triggered alert/event is akin to an SMI (system management interrupt), which is well known in the relevant art(s). Such an alert/event is often times referred to as a watch dog timer. In one embodiment, the time between interrupts may be predetermined. The process then proceeds to block 506.

In block 506, a list of component/device add-in cards residing on the platform is cached. The list may include the device identification (ID), the corresponding vendor ID, the current version of firmware or option ROM residing on the component/device, the location of the add-in card, and any other information that may be helpful in determining where to search for current updates, what updates to download, and the location of component/device where the firmware or option ROM is to be installed. With interfaces such as, but not limited to, the PCI bus which provides a configuration space that identifies attributes associated with the components/devices on the PCI bus, such information may be easy to retrieve. In one embodiment, this information may be retrieved by the out-of-band microcontroller. Yet, in another embodiment, this information may be retrieved by the in-band processor. The process proceeds to block 508.

In block 508, the system waits for an interrupt. Upon receiving an interrupt, the process proceeds to decision block 510.

In decision block 510, it is determined whether the interrupt is for enabling the out-of-band microcontroller to query external resources for updated firmware or option ROMs. If it is determined that the interrupt is not for enabling the out-of-band microcontroller to query external resources for updated firmware or option ROMs, the process proceeds to block 512.

Platforms require interrupts for many different purposes, such as, for example, to handle errors or other platform events. When the current interrupt is not for querying external resources for updated firmware or option ROMs, the interrupt has another purpose that must be determined by an interrupt handler. Therefore, in block 412, the interrupt request is passed to other interrupt handlers to perform the task required by the interrupt request. The process then proceeds back to block 508 to wait for another interrupt request.

Returning to decision block 510, if it is determined that the current interrupt is for enabling the out-of-band microcontroller to query external resources for updated firmware or option ROMs, then the process proceeds to block 514. In block 514, based on the cached list of device/vendor IDs, the out-of-band microcontroller will query external resources to obtain the updates. The process then proceeds to block 516.

In decision block 516, it is determined whether any updates were found for any of the devices on the cached list. If it is determined that no updates were found for any of the devices on the cached list, then the process proceeds back to block 508 to wait for another interrupt request.

Returning to decision block 516, if it is determined that updates were found for one or more of the devices on the cached list, then the process proceeds to block 518. In block 518, the latest revisions of firmware or option ROMs for one or more of the devices on the cached list are downloaded to the out-of-band microcontroller. Whether the add-in components contain the latest revisions of firmware or option ROMs is determined in a similar manner as that described above with respect to passively obtaining the updates. That is, comparing revision number, date, or checksum of the current firmware/option ROMs with those found externally. The process then proceeds to block 520.

In block 520, the downloaded firmware or option ROM images for the one or more devices on the cached list are placed in a platform mailbox by the out-of-band microcontroller. The platform mailbox is accessible to both the out-of-band microcontroller and the in-band processor. The process then proceeds to block 522.

In block 522, the out-of-band processor triggers an interrupt for the in-band processor to notify the in-band processor that updated firmware or option ROM images are available for launching by the in-band processor. The process then proceeds back to block 508 to wait for another interrupt request.

Embodiments of the present invention may be implemented using hardware, software, or a combination thereof. The techniques described herein may find applicability in any computing, consumer electronics, or processing environment. The techniques may be implemented in programs executing on programmable machines such as mobile or stationary computers, personal digital assistants, set top boxes, cellular telephones and pagers, consumer electronics devices (including DVD (Digital Video Disc) players, personal video recorders, personal video players, satellite receivers, stereo receivers, cable TV receivers), and other electronic devices that may include an in-band processor, an out-of-band microcontroller, a storage medium accessible by the in-band processor and the out-of-band microcontroller (including volatile and non-volatile memory and/or storage elements), at least one input device, one or more output devices, and a network connection accessible to the out-of-band microcontroller. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A system for maintaining computer platform components in an optimal state, comprising:
   at least one in-band processor coupled to at least one out-of-band (OOB) processor, wherein the OOB processor couples to a network connection;
   a plurality of add-in cards, each of the add-in cards having firmware or option ROMs (Read Only Memories) to enable performance of the add-in cards; and
   a bus to interface the plurality of add-in cards to the OOB processor, wherein the OOB processor to communicate with independent hardware vendors and remote administrators to obtain firmware and/or option ROM updates over the network connection to autonomously maintain the state of the add-in card firmware and/or option ROMs.

2. The system of claim 1, further comprising a platform mailbox accessible to the at least one in-band processor and the at least one OOB processor, wherein the OOB processor to place the firmware or option ROM updates for the plurality of add-in cards in the platform mailbox and to send an alert to the in-band processor when the firmware or option ROM updates have been placed in the platform mailbox.

3. The system of claim 2, wherein the in-band processor to retrieve the firmware and/or option ROM updates from the platform mailbox and to launch the retrieved firmware and/or option ROM updates.

4. The system of claim 1, wherein the bus interface comprises a PCI (Peripheral Component Interface) bus interface.

5. The system of claim 1, further comprising a cache coupled to the OOB processor, wherein the OOB processor to interrogate the add-in cards coupled to the interface bus and to cache a list of the add-in cards.

6. The system of claim 1, wherein the OOB processor to communicate with the independent hardware vendors or the remote administrators over the network connection to autonomously maintain the state of the add-in card firmware and/or option ROMs further comprises the OOB processor to obtain firmware and/or option updates for the add-in cards.

7. The system of claim 6, wherein to obtain firmware and/or option updates for the add-in cards comprises to receive the updates from the administrator.

8. The system of claim 6, wherein to obtain firmware and/or option ROM updates for the add-in cards comprises to receive a downloaded update from a server repository.

9. A method for maintaining computer platform components in an optimal state, comprising:
   determining whether a platform includes an out-of-band processor; and
   if the platform includes an out-of-band processor,
      enabling the out-of-band processor to passively and proactively obtain firmware and/or option ROM (Read Only Memory) updates for add-in cards on the platform by querying external resources for the firmware and/or option ROM updates;
      receiving an interrupt from the out-of-band processor indicating that the firmware and/or option ROM updates are available; and
      launching the firmware and/or option ROM updates.

10. The method of claim 9, wherein prior to enabling the out-of-band processor to proactively obtain the firmware and/or option ROM updates for add-in cards on the platform, establishing a platform controlled interrupt to trigger an alert/event for the out-of-band processor to query the external resources for the firmware and/or option ROM updates.

11. The method of claim 10, wherein enabling the out-of-band processor to proactively obtain firmware and/or option ROM updates for the add-in cards comprises:
   enabling the out-of-band processor to cache a list of the add-in cards residing on the platform;
   waiting for an interrupt;
   upon receiving an interrupt, determining whether the interrupt is for enabling the out-of-band processor to query external resources for updated firmware and/or option ROMs;
   if the interrupt is for enabling the out-of-band processor to query external resources for updated firmware and/or option ROMs, then based on the cached list of add-in cards, enabling the out-of-band processor to:
      query external resources to obtain the updated firmware and/or option ROMs;
      if updates are found for any of the add-in cards on the platform, determine whether the updates are the most recent updates, receive downloaded versions of the most recent updates, place the downloaded versions of the most recent updates in a platform mailbox, and trigger an interrupt for the in-band processor to notify the in-band processor that the updated firmware and/or option ROMs are available for launching on the platform.

12. The method of claim 11, wherein to determine whether the updates are the most recent updates comprises to determine whether the revision number or date of the firmware and/or option ROM for the cached add-in card is less than the revision number or date of the updated firmware and/or option ROM for the add-in card.

13. The method of claim 11, wherein to determine whether the updates are the most recent updates comprises to determine whether the checksum of the firmware and/or option ROM for the cached add-in card is different from the checksum for the updated firmware and/or option ROM for the add-in card.

14. The method of claim 11, wherein the cached list of the add-in cards includes at least an add-in card identification, a corresponding vendor identification, a revision number or date for the associated firmware or option ROM, and a location for each of the add-in cards.

15. The method of claim 9, wherein enabling the out-of-band processor to passively obtain firmware and/or option ROM updates for the add-in cards comprises enabling the out-of-band processor to obtain firmware and/or option ROM updates from an administrator.

16. The method of claim 9, wherein enabling the out-of-band processor to passively obtain firmware and/or option ROM updates for the add-in cards comprises:

receiving a query from the administrator to provide a list of add-in cards that reside on the platform;

interrogating a PCI configuration space for each add-in card on a PCI bus to generate a cached list of all of the add-in cards;

sending the cached list of add-in cards to the administrator to enable the administrator to correlate the cached list with a database of the latest firmware and/or option ROM updates;

if any update(s) is found, receiving the update(s) from the administrator;

placing the update(s) in a platform mailbox; and sending an interrupt to an in-band processor to alert the in-band processor that the updates are in the platform mailbox.

17. The method of claim 16, wherein the cached list identifies at least an add-in card identification, a corresponding vendor identification, a revision number or date for the associated firmware or option ROM, and a location for each of the add-in cards.

18. The method of claim 16, wherein the administrator determines whether any updates are found by comparing a revision number, date, or checksum for the firmware and/or option ROM on the cached list to the revision number, date, or checksum of the updates in the database, wherein if the revision number or date of the updated firmware or option ROM is later, or if the checksum is different, an update is found.

19. The method of claim 9, wherein enabling the out-of-band processor to proactively obtain firmware and/or option ROM updates for the add-in cards comprises enabling the out-of-band processor to search, via a network connection, for repositories that include firmware and/or option ROM updates for the add-in cards from independent hardware vendors on a network and, when found, enable a server in which the update resides to download the update to the out-of-band processor.

20. An article comprising: a storage medium having a plurality of machine accessible instructions, wherein when the instructions are executed by a processor, the instructions provide for determining whether a platform includes an out-of-band processor; and if the platform includes an out-of-band processor,
  enabling the out-of-band processor to passively and proactively obtain firmware and/or option ROM (Read Only Memory) updates for add-in cards on the platform by querying external resources for the firmware and/or option ROM updates;
  receiving an interrupt from the out-of-band processor indicating that the firmware and/or option ROM updates are available; and
  launching the firmware and/or option ROM updates.

21. The article of claim 20, wherein prior to instructions for enabling the out-of-band processor to proactively obtain the firmware and/or option ROM updates for add-in cards on the platform, the instructions provide for establishing a platform controlled interrupt to trigger an alert/event for the out-of-band processor to query the external resources for the firmware and/or option ROM updates.

22. The article of claim 21, wherein instructions for enabling the out-of-band processor to proactively obtain firmware and/or option ROM updates for the add-in cards comprises instructions for:

enabling the out-of-band processor to cache a list of the add-in cards residing on the platform;

waiting for an interrupt;

upon receiving an interrupt, determining whether the interrupt is for enabling the out-of-band processor to query external resources for updated firmware and/or option ROMs;

if the interrupt is for enabling the out-of-band processor to query external resources for updated firmware and/or option ROMs, then based on the cached list of add-in cards, enabling the out-of-band processor to:
  query external resources to obtain the updated firmware and/or option ROMs;
  if updates are found for any of the add-in cards on the platform, determine whether the updates are the most recent updates, receive downloaded versions of the most recent updates, place the downloaded versions of the most recent updates in a platform mailbox, and trigger an interrupt for the in-band processor to notify the in-band processor that the updated firmware and/or option ROMs are available for launching on the platform.

23. The article of claim 22, wherein instructions to determine whether the updates are the most recent updates comprises instructions to determine whether the revision number or date of the firmware and/or option ROM for the cached add-in card is less than the revision number or date of the updated firmware and/or option ROM for the add-in card.

24. The article of claim 22, wherein instructions to determine whether the updates are the most recent updates comprises instructions to determine whether the checksum of the firmware and/or option ROM for the cached add-in card is different from the checksum for the updated firmware and/or option ROM for the add-in card.

25. The article of claim 22, wherein the cached list of the add-in cards includes at least an add-in card identification, a corresponding vendor identification, a revision number or date for the associated firmware or option ROM, and a location for each of the add-in cards.

26. The article of claim 20, wherein instructions for enabling the out-of-band processor to passively obtain firmware and/or option ROM updates for the add-in cards comprises instructions for enabling the out-of-band processor to obtain firmware and/or option ROM updates from an administrator.

27. The article of claim 20, wherein instructions for enabling the out-of-band processor to passively obtain firmware and/or option ROM updates for the add-in cards comprises instructions for:

receiving a query from the administrator to provide a list of add-in cards that reside on the platform;

interrogating a PCI configuration space for each add-in card on a PCI bus to generate a cached list of all of the add-in cards;

sending the cached list of add-in cards to the administrator to enable the administrator to correlate the cached list with a database of the latest firmware and/or option ROM updates;

if any update(s) is found, receiving the update(s) from the administrator;

placing the update(s) in a platform mailbox; and sending an interrupt to an in-band processor to alert the in-band processor that the updates are in the platform mailbox.

28. The article of claim 27, wherein the cached list identifies at least an add-in card identification, a corresponding vendor identification, a revision number or date for the associated firmware or option ROM, and a location for each of the add-in cards.

29. The article of claim 27, wherein the administrator determines whether any updates are found by comparing a revision number, date, or checksum for the firmware and/or option ROM on the cached list to the revision number, date, or checksum of the updates in the database, wherein if the revision number or date of the updated firmware or option ROM is later, or if the checksum is different, an update is found.

30. The article of claim 20, wherein instructions for enabling the out-of-band processor to proactively obtain firmware and/or option ROM updates for the add-in cards comprises instructions for enabling the out-of-band processor to search, via a network connection, for repositories that include firmware and/or option ROM updates for the add-in cards from independent hardware vendors on a network and, when found, enable a server in which the update resides to download the update to the out-of-band processor.

* * * * *